Oct. 8, 1929.  J. G. KING  1,731,009
REFRIGERATING APPARATUS
Filed April 30, 1923
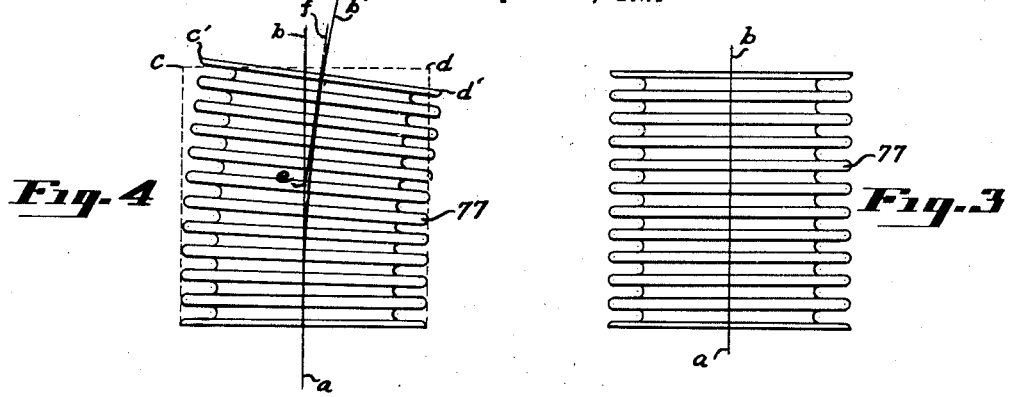
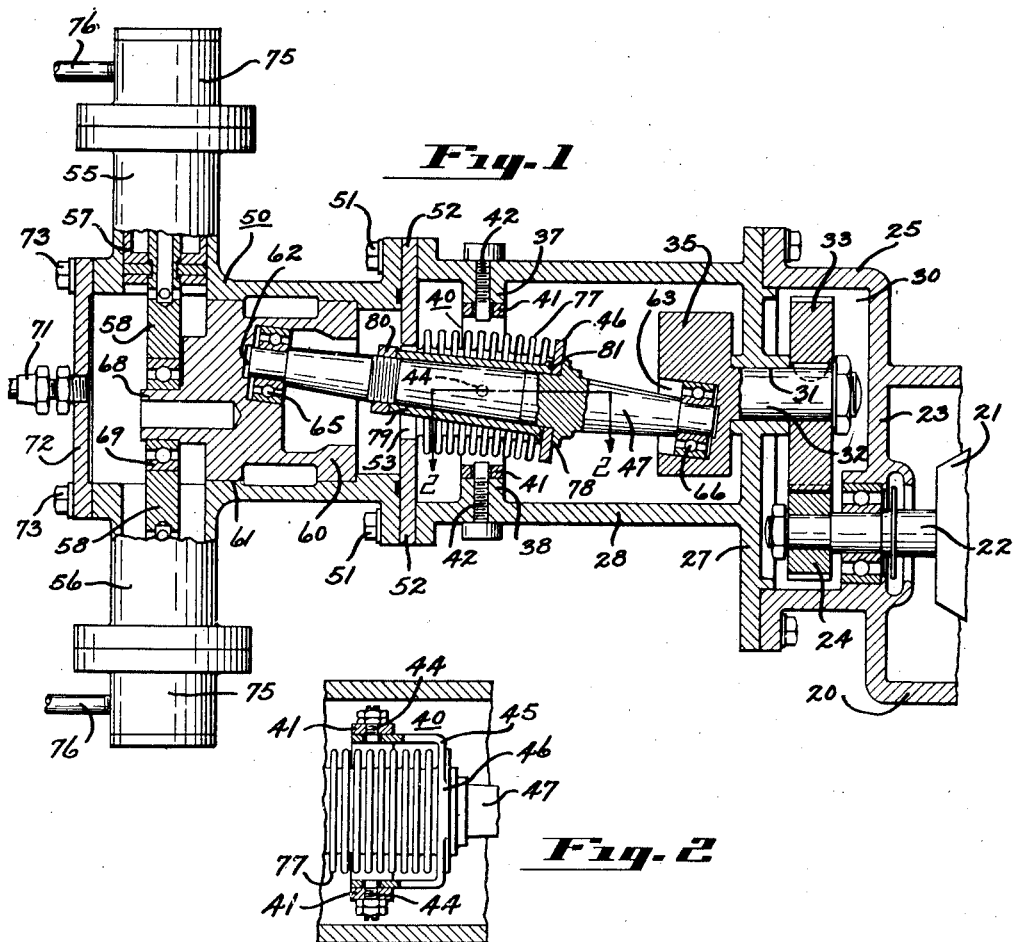
Witnesses
Lloyd M. Keighley
F. J. Hardman
Inventor
Jesse G. King.
By J. Ralph Fehr
His Attorney Patented Oct. 8, 1929

1,731,009

UNITED STATES PATENT OFFICE

JESSE G. KING, OF DAYTON, OHIO, ASSIGNOR, BY MESNE ASSIGNMENTS, TO FRIGIDAIRE CORPORATION, A CORPORATION OF DELAWARE

REFRIGERATING APPARATUS

Application filed April 30, 1923. Serial No. 635,434.

This invention relates to mechanical motion or power transmitting devices, and particularly to devices for transmitting motion from a driving member to a driven member while providing for hermetically sealing the driven member.

It is an aim of the invention to transmit motion to a hermetically sealed mechanism in a simple and efficient manner and with the least wear to a part of the enclosure of the mechanism.

Further objects and advantages of the present invention will be apparent from the following description, reference being had to the accompanying drawing, wherein a preferred embodiment of one form of the present invention is clearly shown.

In the drawing:

Fig. 1 is a horizontal sectional view of the present invention;

Fig. 2 is a sectional view taken on line 2—2 of Fig. 1; and

Figs. 3 and 4 show side views of the sealing device in different positions thereof.

Referring to the drawing, 20 is a motor housing in which is located a motor armature 21 carrying an armature shaft 22 which extends through a wall 23 formed by said housing 20 and carries on its extending end a pinion 24. Housing 20 is provided with a flange 25 which forms with the wall 23 and an end wall 27 of a housing 28 a gear casing 30 in which said pinion 24 is located. End wall 27 is provided with a bearing 31 for a crank shaft 32 carrying a gear 33 which cooperates and is driven by pinion 24. Crank shaft 32 carries a driving member or crank 35 located within the housing 28.

There are provided adjacent the other end of the housing 28 bosses 37 and 38 which carry a wabbling fulcrum or universal joint 40. Universal joint 40 comprises a ring 41 forming a gimbal member pivotally mounted on one or more trunnion pins 42 screwed into the bosses 37 and 38. Ring 41 is provided with oppositely disposed trunnion pins 44 located in quadrature relative to the pins 42. A substantially U-shaped member 45 is fulcrumed upon the pins 44 and has its base portion 46 secured to a wabbling bar or shaft 47 which serves as a driving member connecting the motor and pump. The ring 41 cooperates with the member 45 and pins 42 and 44 to provide a universal joint for the wabbling shaft 47.

A compressor housing 50 is secured to the housing 28 by means of bolts 51. Between housings 50 and 28 there is provided a plate 52 which forms an end wall for the housing 50 and is provided with an opening 53 through which the wabbling shaft 47 extends. Housing 50 merges into oppositely disposed cylinders 55 and 56 in each of which a piston 57 (such as shown in cylinder 55) reciprocates. Both pistons are connected by piston rod 58.

The housing 50 also carries a rotatable element or crank 60 having a bearing surface 61 which contacts with the cylindrical wall of the housing 50. Crank shaft 60 and crank 35 are provided with crank recesses 62 and 63 respectively. The axes of crank shaft 60 and of crank shaft 32 are in alignment and the crank recesses 62 and 63 are obliquely disposed with respect to shafts 60 and 32 and are located in alignment and on opposite sides of the axes of the shafts 60 and 32. The crank recesses 62 and 63 receive bearings 65 and 66 which support the ends of wabbling shaft 47.

Crank shaft 60 is provided with a crank arm 68 which carries a bearing 69 which may rotate with respect to the arm 68 and slide within an elongated aperture (not shown) in connecting rod 58 to impart simple harmonic motion to rod 58 and the pistons 57.

The compressor shown herein is of the type in which the gas to be compressed is taken into the housing. The gas to be compressed is delivered to the compressor by a pipe 71 coupled with an end cover 72 having an opening leading to the interior of the housing 50. End cover 72 is secured to the housing 50 by bolts 73. The gas passes through the pistons to the compression chambers in cylinders 55 and 56 and then through valves in valve heads 75 and out through pipes 76. A more detailed description of the compressor is described in the copending application of Jesse G. King, Serial No. 397,519, filed July 19, 1920.

Whether the compressor be the type disclosed or other piston type compressor there is always a substantial amount of gas within the crank housing of the compressor. Therefore, it is necessary to seal the opening through which the shaft 47 extends in order to prevent the escape of gas from the housing 50. This seal comprises a flexible metallic sleeve 77 or bellows diaphragm commonly known in the art as a sylphon which is brazed or otherwise secured to the plate 52 surrounding the opening 53 at the one end and at its other end secured to the universal joint or wabbling fulcrum 40 by attaching in a like manner to the base portion 46 of the U-shaped member 45 of said wabbling fulcrum. The base portion 46 is clamped between a shoulder 78 formed on the shaft 47 and a sleeve 79 which is secured in position by a nut 80 having screw threaded engagement with the shaft 47. Packing 81 is carried by the end of the sleeve 79 and bears against the base portion 46 to prevent gas from escaping.

Rotation of the motor armature 21 produces rotation of crank 35 which drives intermediate shaft 47 causing it to nutate about the axis of shaft 32 and to drive the crank shaft 60 which in turn drives the compressor. The axis of shaft 47 will intersect the axis of shafts 60 and 32 at a point determined by the intersection of the universal joint trunnions 42 and 44. The bar or shaft 47 therefore wabbles about a plurality of axes, namely, the axis of shafts 32 and 60, the axis of trunnions 42, and the axis of trunnions 44.

In Fig. 4, the method of determining the location of the universal joint 40 with respect to the sleeve 77, is illustrated. It is an aim of the invention to subject the flexible sleeve 77 to the minimum strain in order to obtain long endurance. It has been found that the sleeve bends naturally so that its axis (shown in normal position at $a\,b$ in Fig. 3) will form a circular arc $a\,b'$ in Fig. 4. The lines $a\,e$ and $e\,f$ are tangent to axis $a\,b'$ at the intersections of the axis and the planes of the end flanges of sleeve 77, and intersect at $e$ midway between the end flanges. The axis of the wabbling shaft 47 is located centrally of one end flange at all times and is perpendicular to the plane of said end flange. The axis of crank shafts 60 and 32 is centrally disposed relative to the plane of the other end flange and is perpendicular to the plane thereof. The axes of shafts 60 and 32 and of the shaft 47 should therefore intersect at $e$; in other words the shaft 47 should be pivotally mounted so that its axis at all times intersects the axes of shafts 60 and 32 at a point midway between the ends of the flexible sleeve 77 in order that the sleeve will bend naturally and not be subjected to excessive side strains. Therefore the universal joint 40 providing a pivotal mounting for shaft 47 should be located so that the axis of its trunnion pins 42 and 44 will intersect at $e$ or midway between the end flanges of the flexible sleeve 77.

By experiment the endurance of sleeve 77 may be determined when one flange is wabbled with respect to the other at a certain angle. For example, it may be found that the endurance will be relatively great when the top flange $c\,d$ has been tilted only about 5° to 10°, represented by the position $c'\,d'$ in Fig. 4, for example. Then it follows that the angularity of shaft 47 represented by line $e\,f$ in Fig. 4 should be determined accordingly.

While the form of mechanism herein shown and described constitutes a preferred embodiment of one form of the invention, it is to be understood that other forms might be adopted and various changes and alterations made in the shape, size, and proportion of the elements therein without departing from the spirit and scope of the invention.

What is claimed is as follows:

1. A power transmitting device comprising in combination a wall, a wabbling bar passing thru the wall, a flexible tubular diaphragm surrounding the bar, said diaphragm being sealed to the bar and to the wall, a gimbal member secured to the bar, and a gimbal member surrounding the diaphragm, said gimbal members being pivoted together.

2. A power transmitting device comprising in combination a wall, a wabbling bar passing thru the wall, a flexible diaphragm surrounding the bar, said diaphragm being sealed to the wall and to the bar, a gimbal member secured to the bar, and a gimbal member surrounding the bar, said gimbal members being pivoted together.

3. A power transmitting device comprising in combination a wall, a power transmitting member, a bellows surrounding said member, one end of the bellows being sealed to the wall and the other end being sealed to the member, and a universal joint supporting the member for movement about a point between the normal positions of the end planes of the bellows.

4. A power transmitting device comprising in combination a wall, a power transmitting member, a bellows surrounding said member, one end of the bellows being sealed to the wall and the other end being sealed to the member, and a universal joint disposed outside of the bellows supporting the member for movement about a point between the normal positions of the end plates of the bellows.

5. A power transmitting device comprising in combination a wall, a power transmitting member, a bellows surrounding said member, one end of the bellows being sealed to the wall and the other end being sealed to the member and a universal joint supporting the member for movement about a point approximately at the center of the normal longitudinal axis of the bellows.

6. A power transmitting device comprising in combination a wall, a power transmitting member, a bellows surrounding said member, one end of the bellows being sealed to the wall and the other end sealed to the member and a universal joint disposed outside of the bellows supporting the member for movement about a point substantially at the center of the normal longitudinal axis of the bellows.

7. A power transmitting device comprising in combination a wall, a power transmitting member, a bellows surrounding said member, one end of the bellows being sealed to the wall and the other end being sealed to the member, arms extending oppositely from said member to points outside of and substantially opposite the center of the normal longitudinal axis of the bellows, bearings for the arms at said points, a gimbal member carrying said bearings, and one or more bearings for said gimbal member disposed on an axis perpendicular to the axis of the first-mentioned bearings.

8. A power transmitting device comprising in combination a wall, a power transmitting member passing thru the wall, a flexible tubular diaphragm sealed to the member and to the wall, and means for nutating both ends of the power transmitting member about a point between the ends of the diaphragm.

9. A power transmitting device comprising in combination a wall, a power transmitting member passing thru the wall, a flexible tubular diaphragm sealed to the member and to the wall, and means for nutating both ends of the power transmitting member about a point substantially at the center of the normal longitudinal axis of the diaphragm.

10. Apparatus as defined in claim 9 in which the power transmitting member is supported outside of the diaphragm.

11. A power transmitting device including in combination a rotatable driving member, a rotatable driven member, a fluid-tight partition separating the members including a flexible tubular diaphragm, a power transmitting member having one end connected to each of said driving and driven members, the power transmitting member passing thru and being sealed to the diaphragm, and means for supporting the power transmitting member so that during movement of the driving and driven members the ends nutate in opposite phases about a point between the ends of the diaphragm.

In testimony whereof I hereto affix my signature.

JESSE G. KING.

CERTIFICATE OF CORRECTION.

Patent No. 1,731,009.             Granted October 8, 1929, to

JESSE G. KING.

It is hereby certified that error appears in the printed specification of the above numbered patent requiring correction as follows: Page 2, line 119, claim 4, for the word "plates" read "planes"; and that the said Letters Patent should be read with this correction therein that the same may conform to the record of the case in the Patent Office.

Signed and sealed this 12th day of November, A. D. 1929.

M. J. Moore,
Acting Commissioner of Patents.

(Seal)